July 31, 1962  S. DE LISIO  3,046,925
APPARATUS FOR RAISING SHIPS FROM UNDERWATER
Filed July 24, 1959

INVENTOR.
Salvatore De Lisio
BY Harold E. Cole
Attorney

United States Patent Office 3,046,925
Patented July 31, 1962

3,046,925
APPARATUS FOR RAISING SHIPS FROM UNDERWATER
Salvatore De Lisio, Room 814, 101 Tremont St., Boston 8, Mass.
Filed July 24, 1959, Ser. No. 829,321
7 Claims. (Cl. 114—54)

This application is a continuation-in-part of my pending patent application, Serial No. 624,575, filed November 27, 1956.

This invention relates to apparatus for raising sunken ships and the like that are under water.

One object of my invention is to provide apparatus having an inflatable receptacle in combination with a solid member that discharges gas, that is surrounded by material that permits; but slows the escape of gas, whereby the apparatus becomes buoyant and tends to raise a sunken ship to the surface.

Another object is to provide such apparatus that is portable and of such a size that a large number can be positioned within the interior of a sunken ship at the most advantageous places to provide the desired buoyancy.

A further object is to provide such apparatus in combination with said solid gasifying member that has control means so that it is safe to use when carrying it under water inside the ship to a desired position, and thereafter is equally safe both while the ship is being raised, and after it comes to the surface.

A still further object is to provide such apparatus the cost of which is relatively low both as to the solid, gas forming member, the receptacle to receive it, and other parts thereof.

The foregoing and other objects which will appear as the nature of the invention is better understood, may be accomplished by a combination and arrangement such as is disclosed by the drawing. The nature of the invention is such as to render it susceptible to various changes and modifications, and therefore, I am not to be limited to the construction disclosed by the drawing, nor to the particular parts described in the specification; but am entitled to all such changes therefrom as fall within the scope of my claims.

Figure 1:
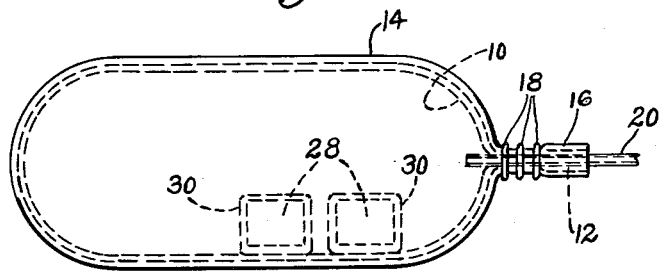
FIG. 1 is a top plan view of my apparatus with a solid member within the receptacle that provides gas.

As illustrated, my apparatus has a receptacle 10, which may be made of plastic or other suitable material that is inflatable; but preferably does not expand by stretching. Said receptacle 10 has a neck portion 12 which may readily be fastened tightly, and reopened as desired.

I preferably place my receptacle 10 in an outer cover 14 which may be made of a strong, protective material such as canvas or burlap, or other suitable covering. Said burlap 14 not only protects said receptacle 10; but its thickness tends to keep a water layer circulating between said receptacle and the burlap, when in its position within a ship, thus tending to avoid freezing of water next to the receptacle. This burlap outer cover 14 has a neck portion 16 to receive said neck portion 12. When said receptacle 10 is placed in said outer cover 14, the receptacle neck portion 12 and the outer cover neck portion 16 are held constricted by a cord 18 which preferably is resilient.

Since a diver may have to carry my apparatus under water for a short time until he places it in position, I preferably provide said receptacle 10 with a removable escape conduit member 20, which may be metal or plastic tubing and have a diameter of about 3/64 inch inside. Said tube 20 extends through said neck 12 and into the interior of said receptacle to permit the escape of gas. To prepare to make said receptacle 10 gas tight, I place a sealing compound 22, in plastic condition, on the interior surface of said neck 12, and thereafter insert said tube 20 in the space that is surrounded by said compound 22.

While my apparatus is being carried to the desired position under water, within the ship, said tube 20 permits the escape of gas from the interior of said receptacle 10 to keep the latter from becoming buoyant and otherwise difficult to carry through the water to a predetermined position within the ship. Once in said position said tube 20 is removed, and said sealing compound, which said cord 18 keeps under some compression, closes the space in the neck previously occupied by said tube, so the receptacle is tight, and no gas can thereafter escape from it.

Figure 2:
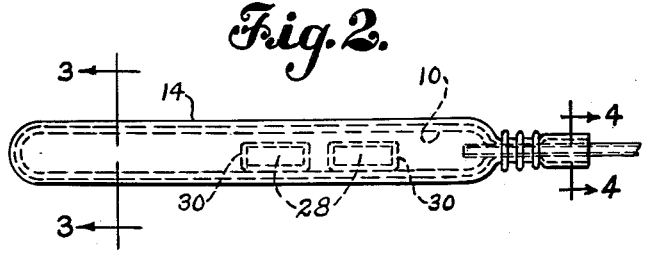
FIG. 2 is a side elevational view of said apparatus; but otherwise similar to FIG. 1.
Figure 3:
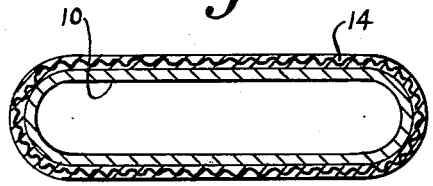
FIG. 3 is an enlarged sectional view taken on the line 3—3 of FIG. 2.
Figure 4:
FIG. 4 is an enlarged sectional view taken on the line 4—4 of FIG. 2.

Within said receptacle 10, before it is closed, there is placed solidified carbon dioxide 28, which is a solid block, I have indicated two blocks in FIGS. 1 and 2 of the drawing; but one would be suitable, if desired, or three or more could be used. This solidified carbon dioxide 28 will gasify, that is, turn to gas, within said receptacle 10, thus inflating it and making it buoyant.

Solidified carbon dioxide is relatively easy and safe to handle, as well as inexpensive, and should the gas emanating therefrom escape from the receptacle 10, as in case of accident, no serious damage will be done to anything or anyone.

It is important to keep said block of solid carbon dioxide surrounded by excelsior 30 so that the carbon dioxide gas will not escape so rapidly that it causes parts of the receptacle to stiffen due to direct contact with the surrounding water which will freeze. The excelsior has openings or passages that run indirectly therethrough so that carbon dioxide gas can slowly escape and inflate the receptacle; but not so rapidly as to result in said freezing and stiffening of parts of said receptacle. Any material that has such openings therethrough will serve the purpose; but use of excelsior is especially advantageous since it is inexpensive and plentiful. This excelsior 30 may be one inch thick, for instance.

To give an example as to the dimensions of my invention, said receptacle 10 might measure 5 feet by 5 feet, and 10 feet long, in which event a block of solidified carbon dioxide that weighed 50 pounds would be suitable. However, this is merely an illustration, and is not intended to provide a table, as the size of the receptacle, as well as the weight of said block, would vary, depending upon conditions.

What I claim is:

1. Apparatus for raising ships from under water comprising an inflatable gas-tight receptacle, a solid member of carbon dioxide loosely enclosed within said receptacle, excelsior surrounding said member, and a relatively dense cover of water pervious material enclosing said receptacle.

2. Apparatus for raising ships from under water comprising an inflatable gas-tight receptacle, a solid member of carbon dioxide loosely enclosed within said receptacle, excelsior surrounding said member, and a relatively dense cover of water pervious burlap enclosing said receptacle.

3. Apparatus for raising ships from under water, comprising an inflatable gas-tight receptacle, a solid member of carbon dioxide loosely enclosed within said receptacle, excelsior of substantially one-inch in thickness enclosing said member to retard the escape of gas from said solid member, and a relatively dense cover of water pervious material enclosing said receptacle.

4. Apparatus for raising ships from under water, comprising an inflatable gas-tight receptacle, a solid member of carbon dioxide loosely enclosed within said receptacle, and material formed of independent fibers in irregular contact with each other surrounding said member that is a relatively poor conductor of heat and has openings extending indirectly therethrough, and a relatively dense cover of water pervious material enclosing said receptacle.

5. Apparatus for raising ships from under water, comprising an inflatable gas-tight receptacle, a solid member of carbon dioxide enclosed within said receptacle, material surrounding said member that is a relatively poor conductor of heat and has openings extending indirectly therethrough to retard the escape of gas from said solid member of carbon dioxide, a cover enclosing said receptacle, said receptacle having a neck portion and said cover having a neck portion outside of and opposite said receptacle neck portion, said receptacle neck portion having a plastic sealing compound surrounding the inner surface thereof, and a hollow tube extending into said receptacle neck portion and into the interior of said receptacle and surrounded by said plastic sealing compound while the latter is in plastic condition.

6. Apparatus for raising ships from under water, comprising an inflatable gas-tight receptacle, a solid member of carbon dioxide enclosed within said receptacle, material surrounding said member that is a relatively poor conductor of heat and has openings extending indirectly therethrough to retard the escape of gas from said solid member of carbon dioxide, a cover enclosing said receptacle, said receptacle having a neck portion and said cover having a neck portion outside of and opposite said receptacle neck portion, said receptacle neck portion having a plastic sealing compound surrounding the inner surface thereof, a hollow tube extending into said receptacle neck portion and into the interior of said receptacle and surrounded by said plastic sealing compound while the latter is in plastic condition, and a cord extending firmly around both said portions.

7. Apparatus for raising ships from under water, comprising an inflatable gas-tight receptacle, a solid member of carbon dioxide enclosed within said receptacle, said receptacle having a neck portion, said receptacle neck portion having a plastic sealing compound surrounding the inner surface thereof, and a hollow tube extending into said receptacle neck portion and into the interior of said receptacle and surrounded by said plastic sealing compound while the latter is in plastic condition.

References Cited in the file of this patent

UNITED STATES PATENTS

| | | |
|---|---|---|
| 576,052 | Grant | Jan. 26, 1897 |
| 1,600,308 | Blanchard | Sept. 21, 1926 |
| 2,120,057 | Merrill | June 7, 1938 |
| 2,413,313 | Cook | Dec. 31, 1946 |